United States Patent [19]

O'Gwynn

[11] Patent Number: 4,689,706
[45] Date of Patent: Aug. 25, 1987

[54] APPARATUS AND METHOD FOR ADJUSTING THE RESPECTIVE POSITIONS OF A MAGNETIC HEAD AND VIDEO INFORMATION ALONG A MAGNETIC TRACK

[75] Inventor: David C. O'Gwynn, San Mateo, Calif.

[73] Assignee: Ampex Corporation, Redwood City, Calif.

[21] Appl. No.: 418,491

[22] Filed: Sep. 15, 1982

[51] Int. Cl.⁴ .............................................. G11B 27/02
[52] U.S. Cl. .................................. 360/14.2; 360/14.1
[58] Field of Search ................ 360/77, 70, 14.2, 13, 360/14.1, 10.2, 14.3, 35.1

[56] References Cited

U.S. PATENT DOCUMENTS

| | | | |
|---|---|---|---|
| 3,663,763 | 5/1972 | Trost | 360/70 |
| 3,742,132 | 6/1973 | Sanguu et al. | 360/70 |
| 3,764,755 | 10/1973 | Yamashita et al. | 360/70 |
| 3,978,521 | 8/1976 | Langer et al. | 360/70 |
| 4,151,569 | 4/1979 | Hathaway | 360/77 |
| 4,152,734 | 5/1979 | Louth | 360/77 |
| 4,210,943 | 7/1980 | Nakamura et al. | 360/70 |
| 4,223,358 | 9/1980 | Kubota et al. | 360/75 |
| 4,255,771 | 3/1981 | Kubota | 360/77 |
| 4,296,443 | 10/1981 | Sakamato et al. | 360/77 |
| 4,390,908 | 6/1983 | Nakamura et al. | 360/70 |
| 4,443,823 | 4/1984 | Sakamoto | 360/77 |
| 4,447,835 | 5/1984 | Smith | 360/10.2 |
| 4,528,603 | 7/1985 | Abe | 360/70 |

FOREIGN PATENT DOCUMENTS

| | | |
|---|---|---|
| 2948906 | 6/1981 | Fed. Rep. of Germany . |
| 2064830 | 6/1981 | United Kingdom . |
| 2068599 | 8/1981 | United Kingdom . |
| 2071879 | 9/1981 | United Kingdom . |
| 2089071 | 6/1981 | United Kingdom . |

OTHER PUBLICATIONS

Patent Abstracts of Japan, vol. 6, No. 82 (P-116) [960], 20th May 1982; and JP-A-57 19 803 (Tokyo Shibaura Denki K.K.) 02-02-1982.

*Primary Examiner*—Raymond F. Cardillo
*Assistant Examiner*—Steven R. Garland
*Attorney, Agent, or Firm*—Rodney L. Marett; Ralph L. Mossino; James LaBarre

[57] ABSTRACT

A new automatic tracking method is disclosed for the accurate positioning of a magnetic head with information previously recorded on the magnetic tape. If a moveable magnetic head is used, the position thereof is first normalized. Thereafter tracking is automatically adjusted based on a repetitive sampling process in which the results are mathematically averaged to determine a precise center position. Finally, new video material is physically positioned on the magnetic track according to a single offset error measurement.

13 Claims, 19 Drawing Figures

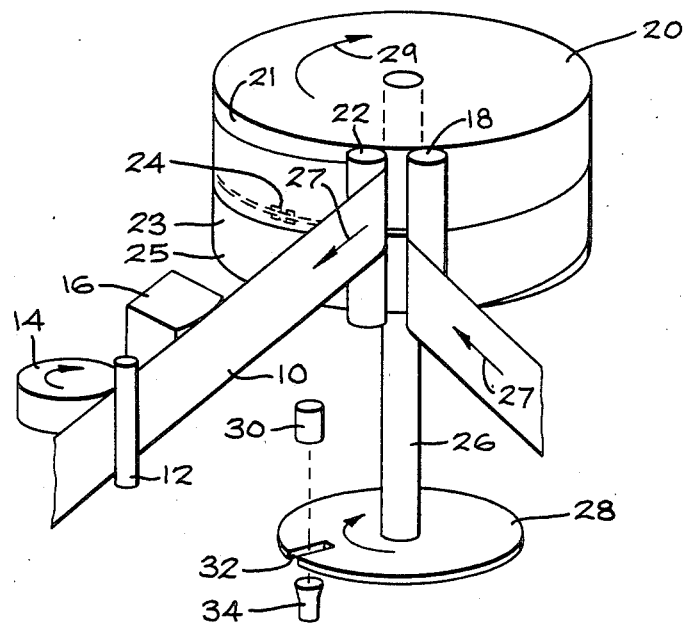
FIG_1
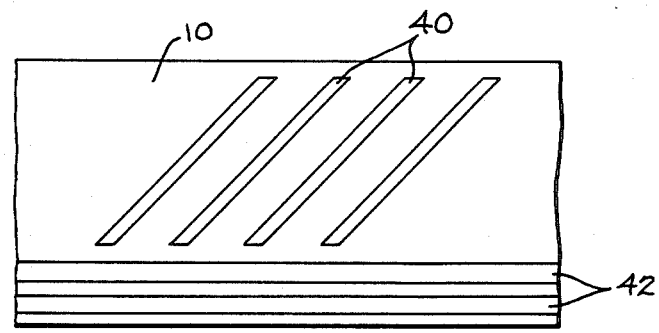
FIG_2
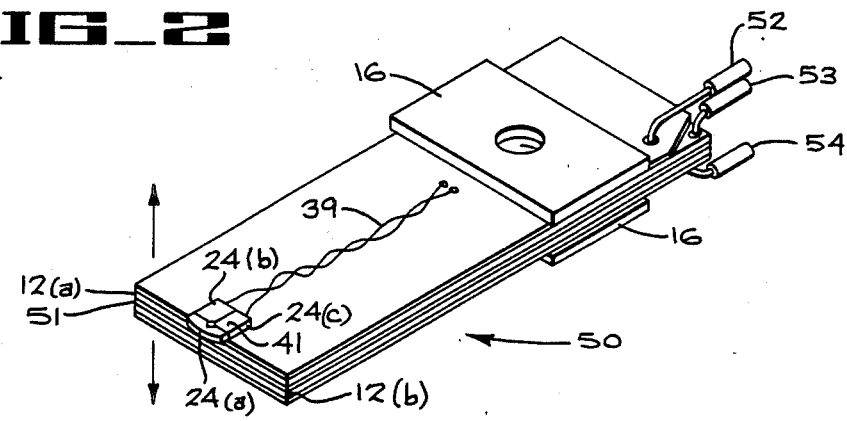
FIG_3

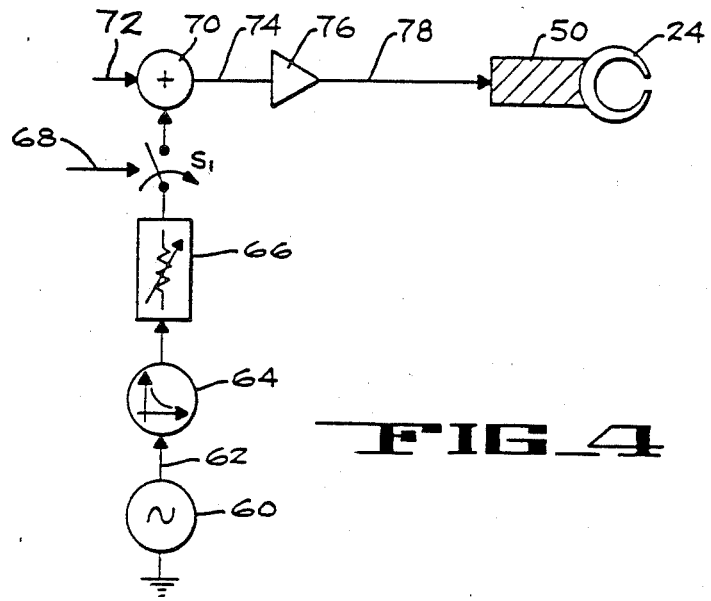
FIG_4
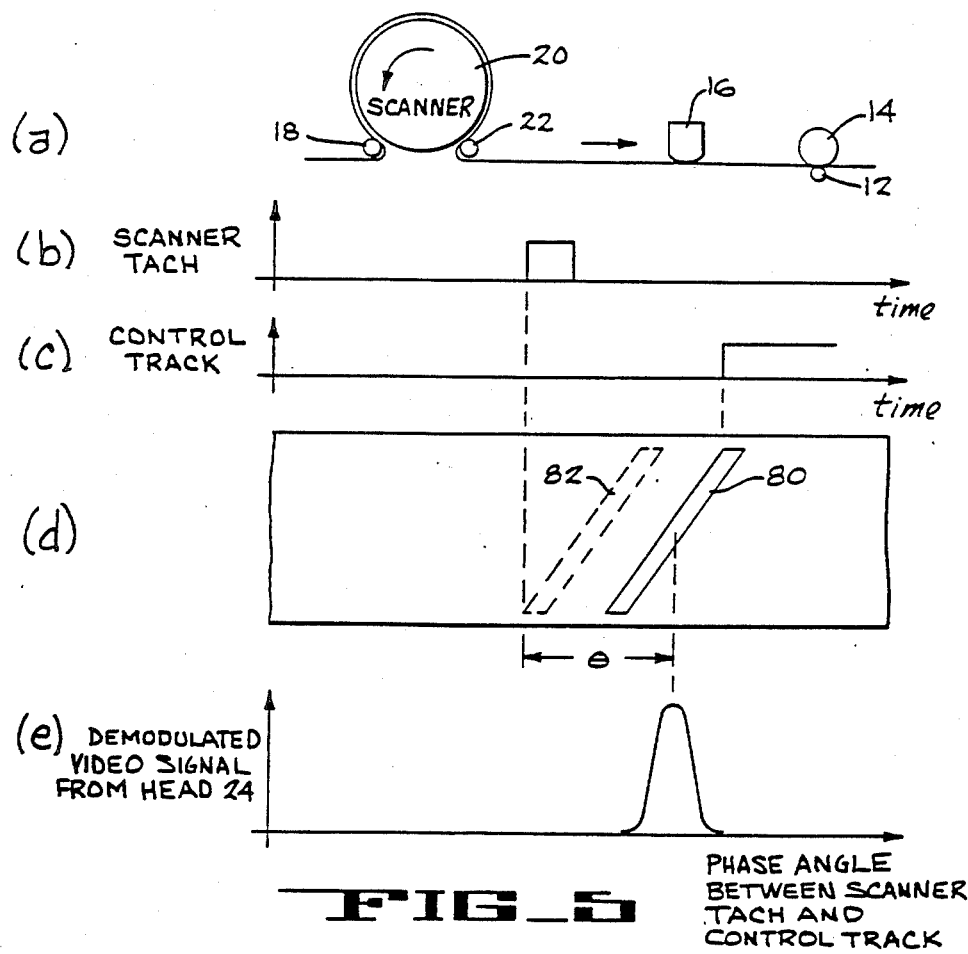
FIG_5

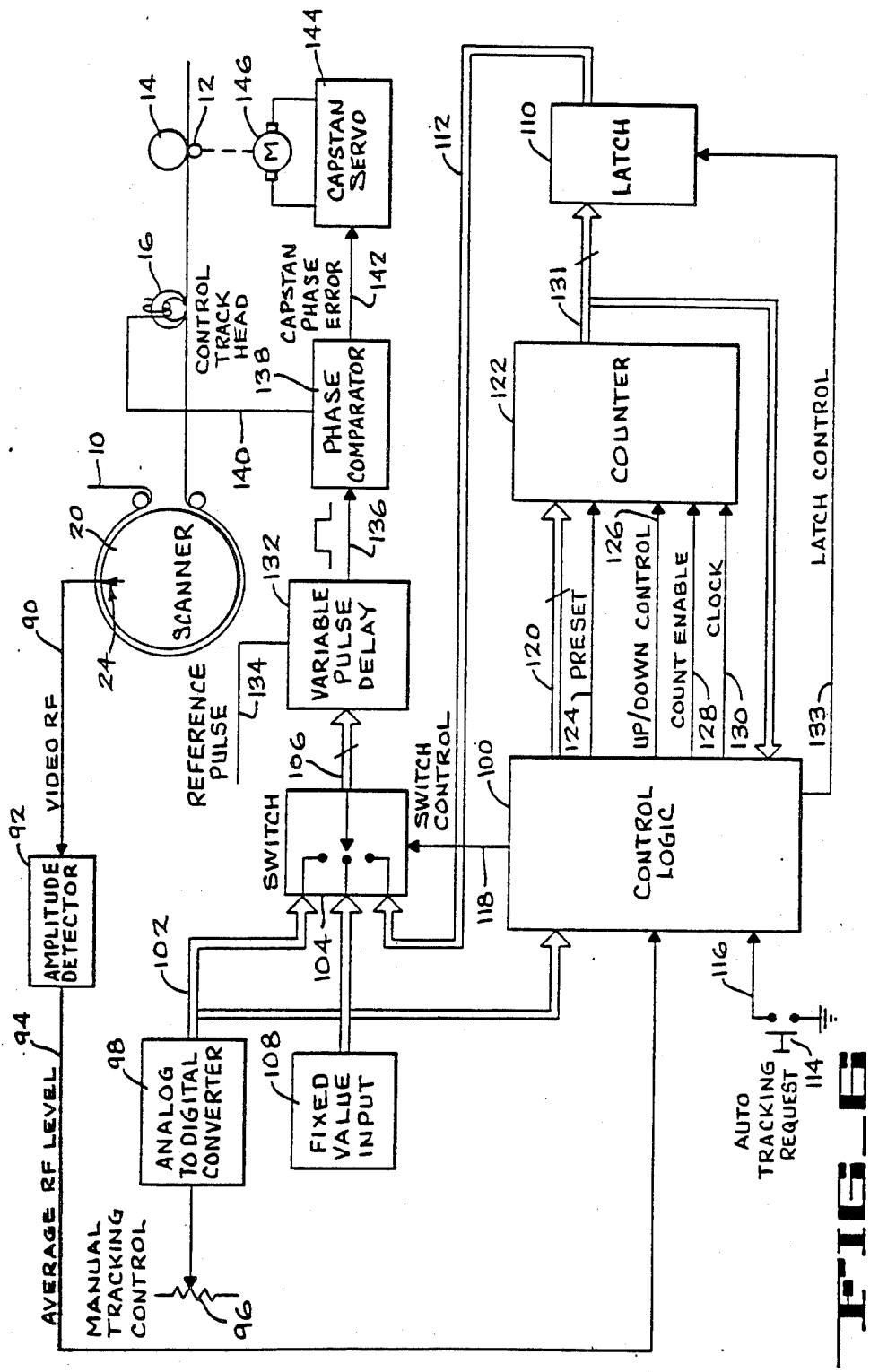

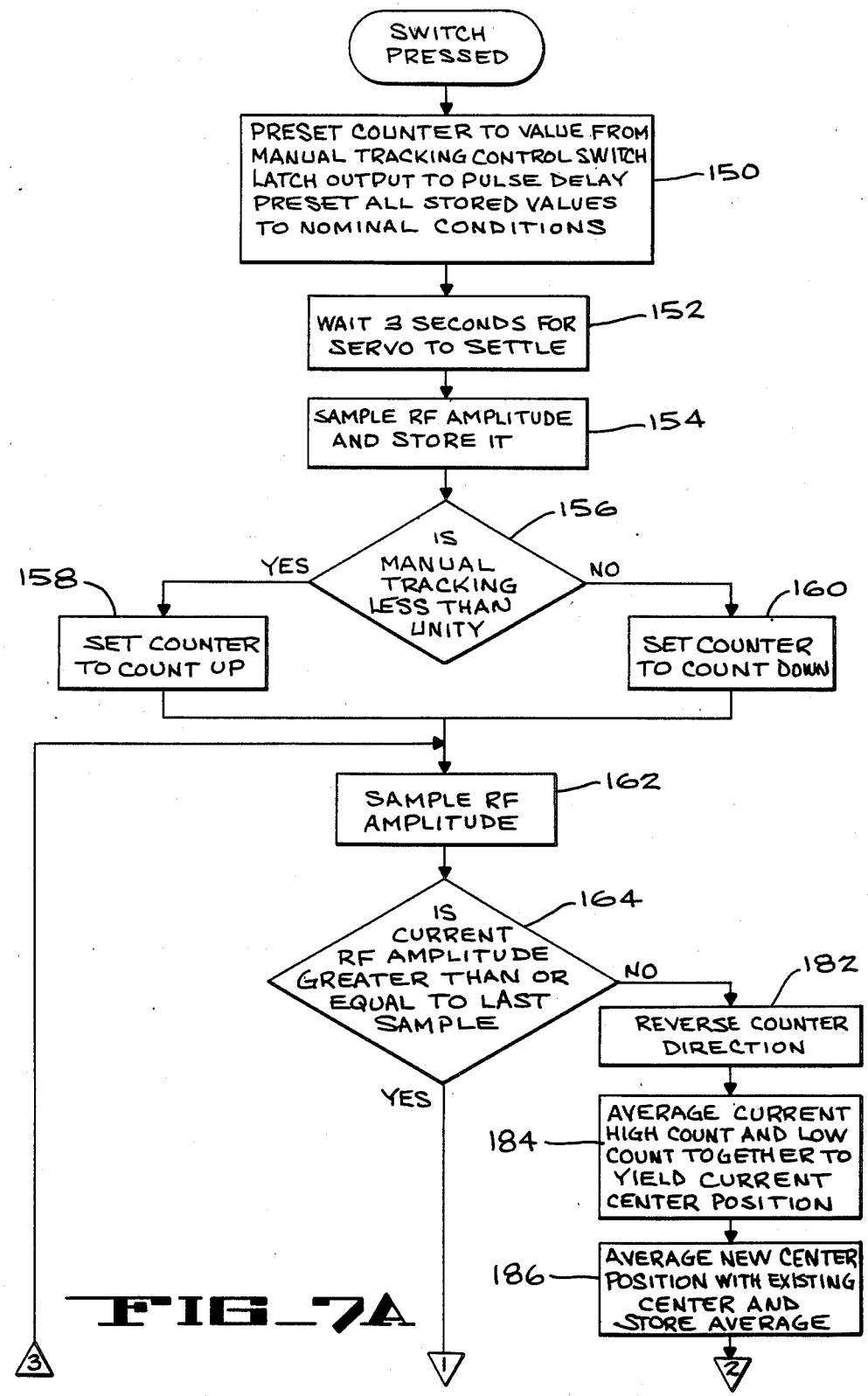
FIG_7A

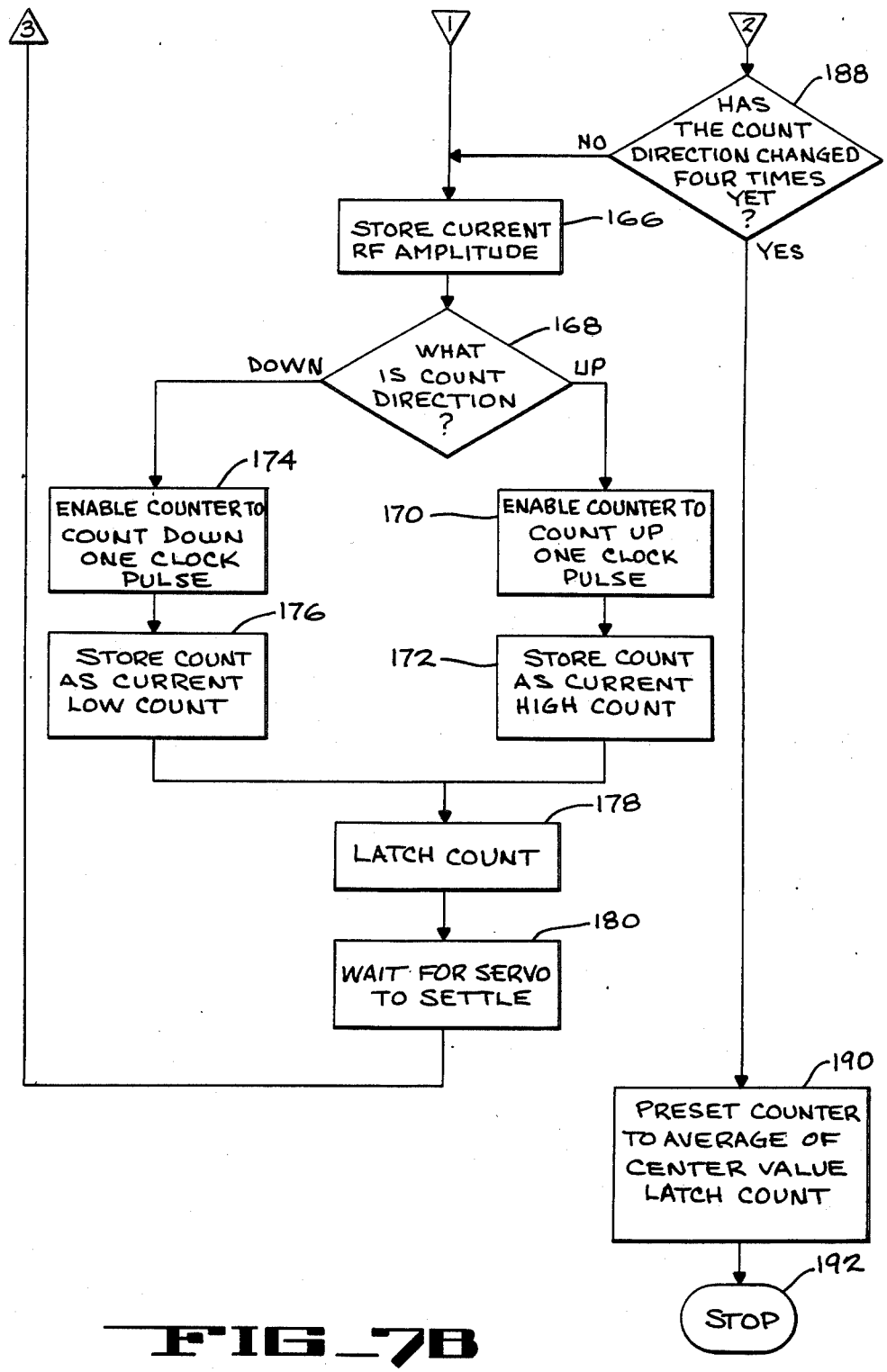
FIG_7B

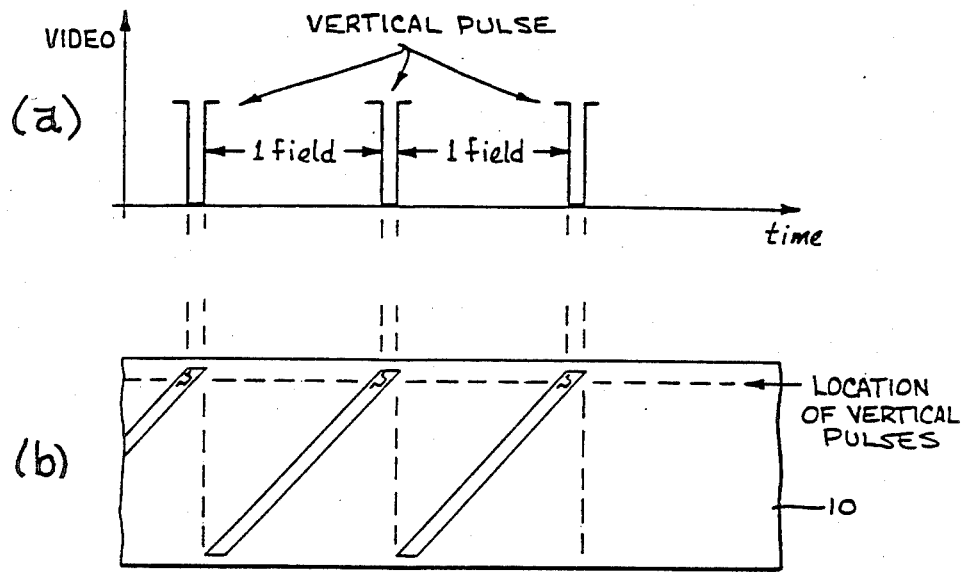
FIG_8
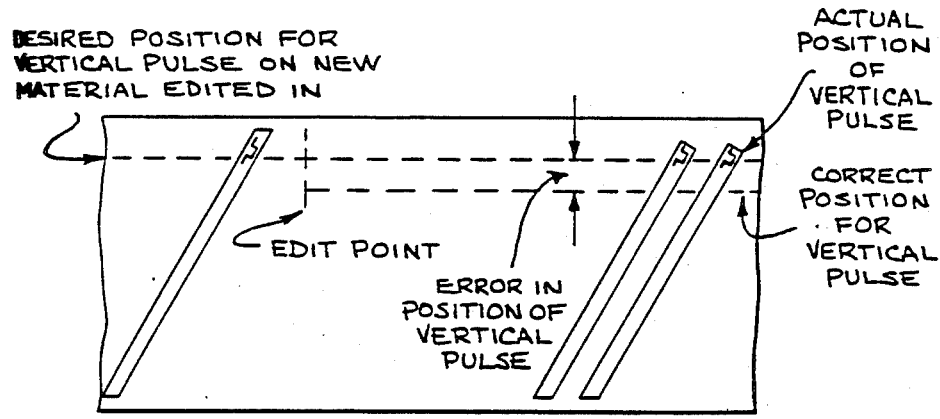
FIG_9

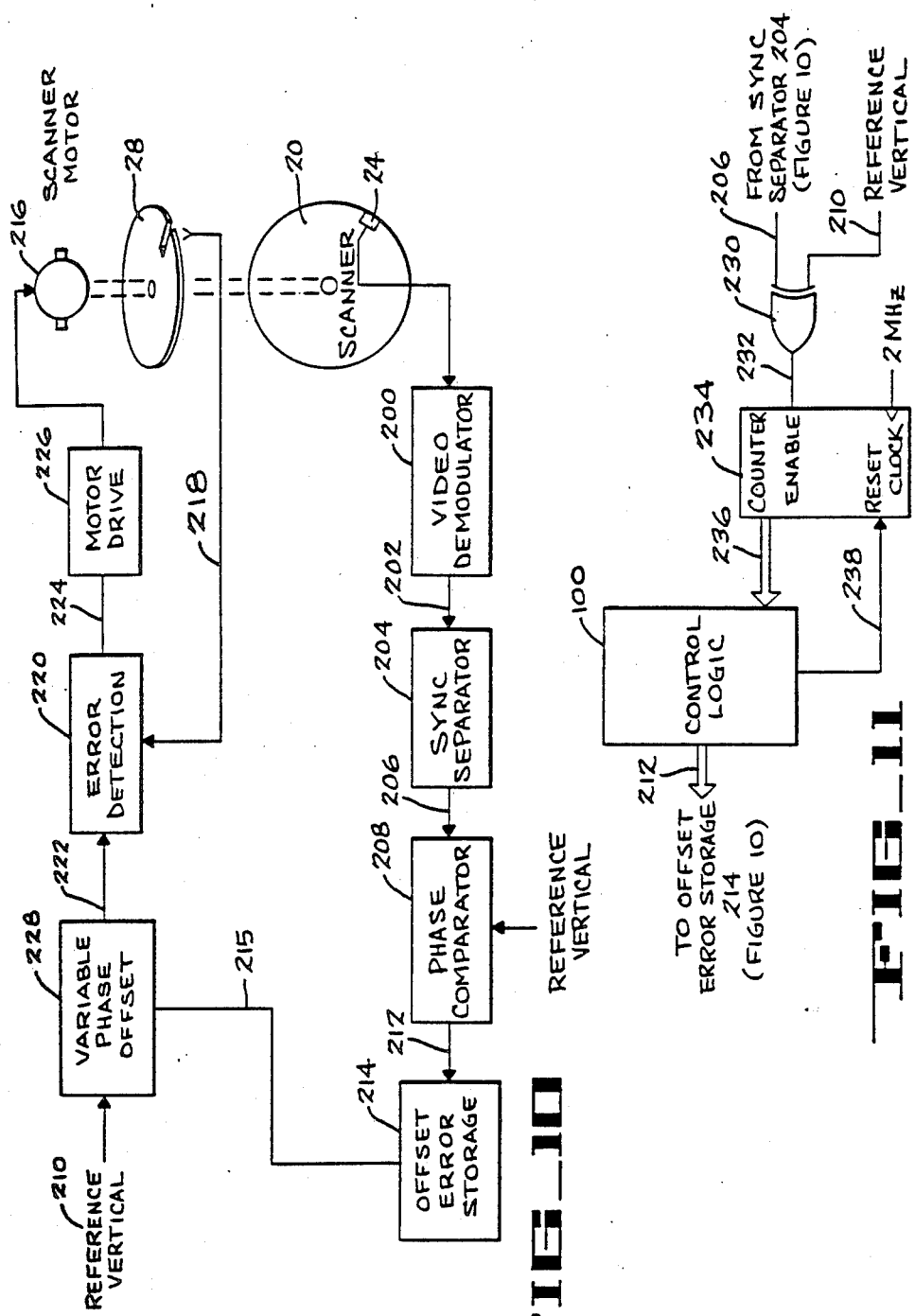

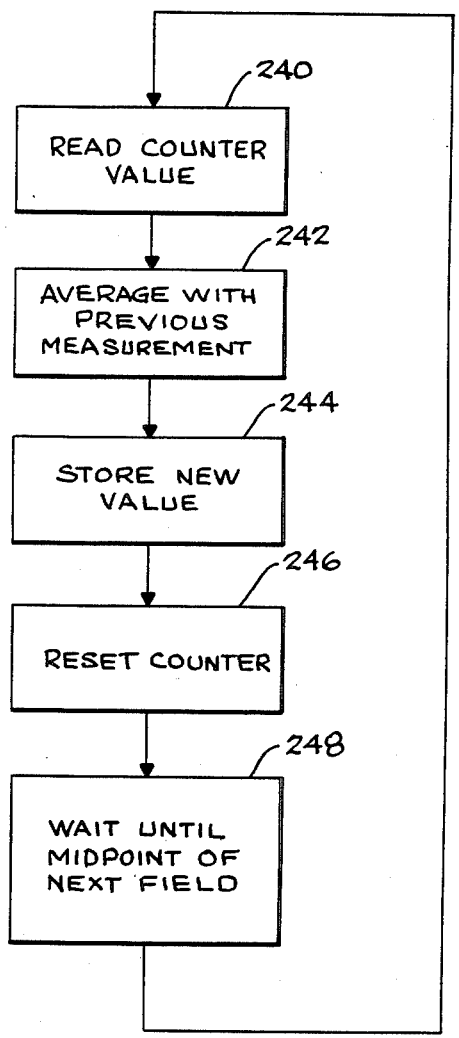
FIG_12A

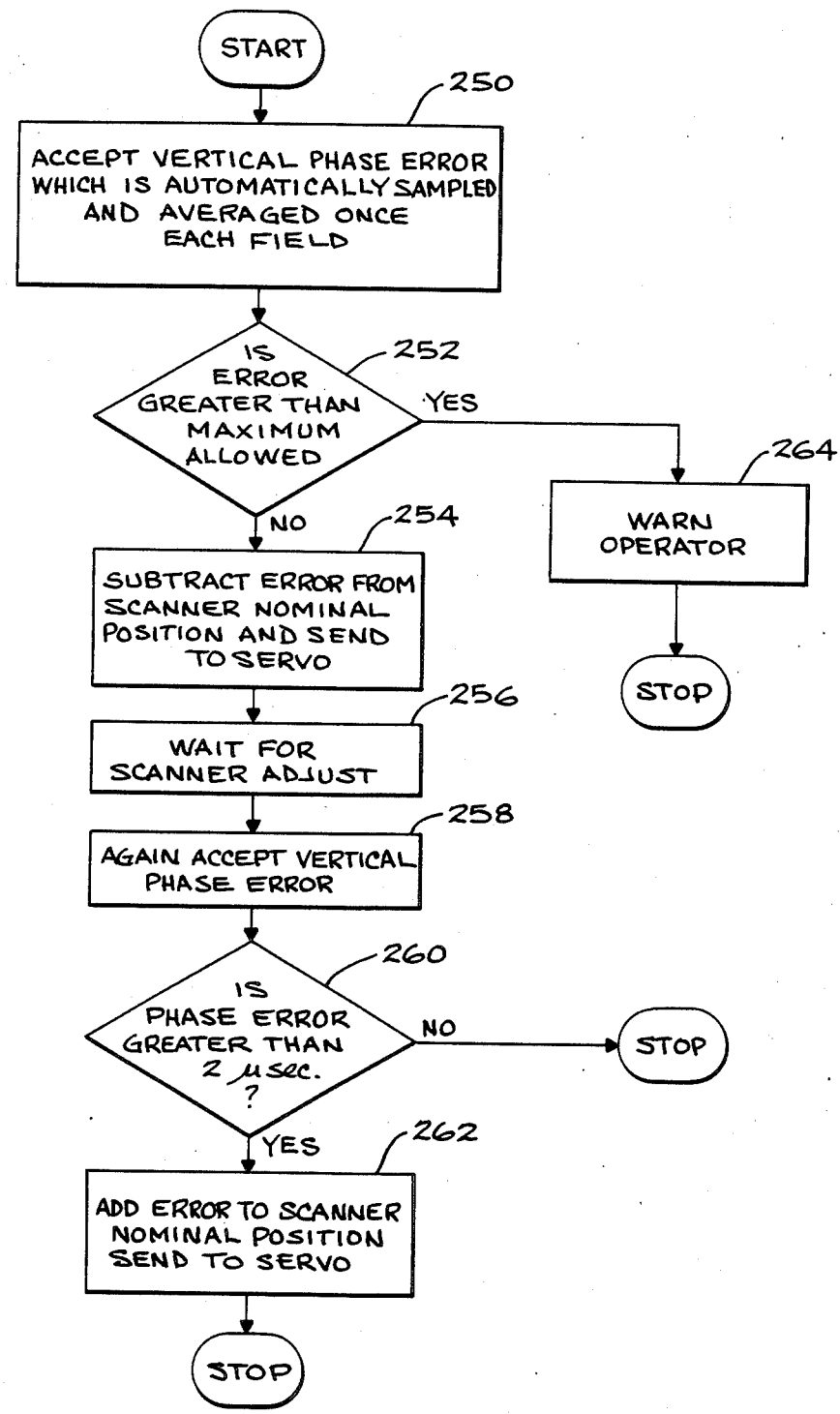
FIG_12B

APPARATUS AND METHOD FOR ADJUSTING THE RESPECTIVE POSITIONS OF A MAGNETIC HEAD AND VIDEO INFORMATION ALONG A MAGNETIC TRACK

BACKGROUND OF THE INVENTION

This invention is in the field of video recording and more particularly relates to a method for the precise positioning of a record/reproduce head on previously recorded material.

In the recording of video information on magnetic tape, relative motion is required between the magnetic record head and the magnetic tape, due to the bandwidth of video signals. In particular, not only is the magnetic tape moved past the magnetic recording head, but the magnetic recording head also moves relative to the tape.

The motion of the magnetic head relative to the magnetic tape can take one of several different forms. In the well known quadraplex format there are usually four magnetic recording heads positioned 90° apart on a rotating drum. The drum rotates in a plane which is perpendicular to the surface of the magnetic tape with the axis of rotation parallel to the direction of motion of the tape. While the drum rotates a capstan physically moves the tape past the rotating drum. Consequently each head on the rotating drum records a signal in a segmented manner across the surface of the tape positioned perpendicular to the sides of the tape. In such a procedure, the video signal to be recorded is sequentially switched among the heads in such a manner to be supplied to the particular head which is in contact with the magnetic tape. In this manner a relatively large head to tape speed can be achieved which permits the recording of video information.

Audio information is also simultaneously recorded on the magnetic tape along with the video in a conventional manner employing a fixed positioned audio record head. Generally the audio tracks are physically positioned longitudinally above and below the segments of recorded video adjacent to the edges of the tape.

In the quadraplex format above described, a plurality of magnetic recorded segments are usually necessary to record a complete field of a television picture.

In yet another format used in the recording of video information on magnetic tape, the video information is recorded in segments positioned diagonally across the surface of the magnetic tape. This is accomplished by employing one or a plurality of magnetic recording heads which are positioned radially outward on the circumference of a disc which is rotated, hereinafter generally referred to as the scanner. The magnetic tape is routed around the circumference of the rotating plane in a helical fashion. Consequently as the surface of the magnetic tape is physically moved around the circumference of the rotating disc having one or a plurality of magnetic recording heads mounted thereon, the resulting signal which is recorded on the magnetic tape is positioned diagonally across the width of the magnetic tape. In this manner a relatively large head to tape speed can be achieved which permits the recording of video information.

Depending upon the particular format a complete television field is recorded in either a single diagonal magnetic track or a plurality of magnetic tracks.

Audio information is likewise simultaneously recorded on the magnetic tape along with the video in a conventional manner employing a fixed position audio record head. Generally the audio tracks are physically positioned longitudinally above and below the segments of recorded video adjacent to the edges of the tape.

For the purposes of clarity of discussion, the following discussion will be limited to the nonsegmented helical format. Similar consideration as discussed below would apply to other recording formats, and would be apparent to those having ordinary skill in the art.

In the above described approaches which are typical of the manner in which video information is recorded on magnetic tape, correct positioning of the video information on the magnetic tape is absolutely essential to the successful playback of the information. Clearly video information which is incorrectly recorded would present problems in the subsequent playback, due to the complex practical considerations which are involved. This problem becomes even more acute if the interchange of previously recorded magnetic tapes is desirable between different video recording/reproducing machines.

The problems involved in the recording of video information on magnetic tape become even more demanding when it is desirable to place additional video information on a previously recorded magnetic tape in such a manner to match that previously recorded. This process, referred to as editing, involves the selected placement of additional record tracks adjacent to previously recorded tracks. The physical placement of the recorded tracks of the additional video information is very critical if satisfactory playback is to be achieved. In conjunction with the correct physical placement of the newly recorded tracks are similar critical requirements relating to the timing characteristics. This task involved basically two considerations: the physical placement of the magnetic track on the magnetic recording tape and the relative positioning with reference to time of the corresponding electrical signal on the magnetic track.

Referring first to the physical placement of the magnetic track on the magnetic recording tape, the magnetic track containing the new video information must be positioned with precisely the same distance and angular parameters as present on existing recorded magnetic tracks. In particular, the mechanical parameters of the angular placement of the new magnetic tracks, the physical length of the new magnetic track, the distance between the edge of the magnetic tape and the starting point of the new magnetic track and, in particular, the horizontal spacing between the new magnetic track and previously existing magnetic tracks must correspond.

From a practical standpoint, most of the physical parameters are either determined at the time of manufacture of the equipment, or are controlled by considerations not relevant to the present discussion. However, the single physical parameter which is relevant to the present discussion is the horizontal or longitudinal spacing between the new magnetic tracks and those previously existing on the magnetic tape. Due to the nature of the process of placement of the magnetic tracks on the magnetic tape, the distance between tracks will generally be regular, again being determined by considerations not relevant to the present discussion. However, the significant parameter of relevance is the spacing between the last magnetic track of previously existing information on the magnetic tape and the new track to be added. This distance is critical, and must be precise, because once set it will determine the accuracy of the reproduction of subsequent tracks.

There is generally recorded on one of the above described audio tracks on magnetic tape, along with video information, a series of regularly spaced pulses. This track is known in the art as the control track. There is also affixed to the above discussed scanner a tachometer which produces a pulse indicative of a particular angular position on the scanner, hereinafter referred to as the tach pulse. As the control track pulses directly relate to linear tape position, and the tach pulse directly relates to angular position of the scanner, the relative phase difference between the two is directly proportional to the horizontal or longitudinal spacing between sequential magnetic tracks. Consequently varying this phase angle results in a directly proportional variation in the horizontal or longitudinal spacing of the magnetic tracks.

In particular, in the recording of video information, by varying this phase angle, the corresponding distance between the magnetic tracks which are recorded on the magnetic tape will be varied, e.g., increasing this phase angle increases the horizontal spacing between the last previous track and the first new track.

In a similar fashion, in the reproduction of video information from magnetic tape, varying this phase angle will directly control the alignment of the reproduce magnetic head with the magnetic tracks previously recorded on the tape.

Consequently, by varying the phase angle, the horizontal distance between sequential magnetic tracks can be directly controlled.

In the process of reproducing previously recorded material on magnetic tape, it is frequently necessary to adjust the above described phase angle to effect correct alignment between the reproduce magnetic head and the video information recorded on magnetic tape. As the signal from the reproduce magnetic head will be maximum when the reproduce magnetic head is in direct alignment with the previously recorded magnetic tracks, by monitoring the level from the reproduce magnetic head as the above discussed phase angle is varied, correct alignment can be achieved. This process is referred to in the art as adjusting the "tracking".

In a similar fashion when it is desired to perform an edit operation, i.e., record new video information adjacent to previously recorded video information, by performing the above described tracking adjustment, correct horizontal placement of the subsequently recorded new video information will result.

Consequently prior to performing an edit operation, it is essential to adjust tracking, i.e., adjust the phase angle between control track pulses and the pulse produced by the scanner tach to achieve a maximum signal level from the reproduce magnetic head. Performing this adjustment will ensure that the horizontal spacing between the existing magnetic tracks and the subsequently recorded magnetic tracks will be precise.

In the past, this has been accomplished by the operator manually adjusting a potentiometer which controls the above described phase angle for a maximum level indication on a meter which monitors the level from the reproduce magnetic head. This procedure has a number of disadvantages. First, as the operation requires a human operator, the results are subject to human error, including the complete omission of the procedures. Furthermore, the resulting accuracy of horizontal placement of the video information on magnetic tape is directly dependent on the accuracy of the tracking adjustment. Clearly a precision adjust is highly desirable.

In addition to the adjustment of the horizontal spacing of the subsequently recorded magnetic tracks with reference to previously recorded magnetic tracks, the placement of the new video material with respect to time on the magnetic track is likewise critical.

A video signal has a well defined electrical format with respect to time which provides for the placement of video information in particular time segments thereof. A video signal also contains a number of well defined periodically occurring pulses which serve as reference points with respect to the location of video information within the video signal itself. These reference points are useful in the processing of the information contained in the video signal. One such reference pulse is referred to as the vertical pulse, and serves to identify the end of video information which defines a television field.

The vertical pulse is particularly important in the recording of video signals, as it is used to control the physical placement or positioning of video information with respect to time on a magnetic track.

For the purposes of illustration, the following discussion will assume that the video information for a complete television field is recorded on each magnetic track diagonally positioned across the width of the magnetic tape, as above discussed.

As each magnetic track is recorded in a serial fashion, it is clear that linear position along a particular magnetic track corresponds directly to time. Consequently in the recording of a video signal, the various portions thereof each will be recorded or placed in a particular physical location along the magnetic track which directly corresponds to the time at which the various portions occurred. In particular, as the vertical pulse occurs at the end of each field of video information, and linear position along the magnetic track on which the signal is recorded corresponds directly to time, the vertical pulse will be recorded at a particular position on the magnetic track toward the end. Furthermore, as the occurrence of the vertical pulse is regular in time, the corresponding linear position of the vertical pulse recorded on tape will be regular, i.e., the vertical pulse will be placed in the same relative linear position along the magnetic tracks for each magnetic track recorded.

When it is subsequently desired to record additional video information on a magnetic tape on which video information has been previously recorded, it is highly desirable for the resulting magnetic tracks of the new video information to have the identical physical parameters of the previously recorded video information.

In particular, it is not only desirable that the horizontal or longitudinal spacing between each magnetic track remain constant, but also that the video information placed on the magnetic track be positioned in an identical manner to that which was previously recorded. As the location of the vertical pulse is the same for all video signals, clearly the desired result can be obtained by placing the new video information on the magnetic track in such a manner that the vertical pulses associated therewith be in the same physical linear position on the magnetic tape as the vertical pulses associated with previously recorded video information.

In the past, when it has been desired to perform an edit operation, i.e, record additional video information on a magnetic tape containing previously recorded video information, the recording apparatus achieves the alignment of the vertical pulse on the newly recorded information with that previously recorded on the magnetic tape in the following manner.

Prior to the recording of the additional video information, the recording apparatus determines the corresponding physical location of the vertical pulse on the existing magnetic tracks. Thereafter, upon the recording of the new video information, the recording apparatus positions the vertical pulses associated with each field in the corresponding linear position on each magnetic track recorded in the same position as that determined from the previously recorded material. This can be done by adjusting the phase angle between the reference pulses and the scanner tach pulse. In theory, the resulting newly recorded video information will be placed on the magnetic tape in the same relative physical location along the magnetic tracks as the previously recorded information, i.e., the corresponding linear position along the respective magnetic tracks of the vertical pulse associated with each of the previously recorded magnetic tracks of video information will be in the same relative location along the respective magnetic tracks for the newly recorded video information.

In practice, however, this is not the case, due to the error associated with the measurement process. In particular, the associated electronic circuitry, and mechanical system involved with the positioning of the newly recorded video information on the magnetic track in such a manner as to result in the placement of the vertical pulse in the same linear location as vertical pulses associated with previously recorded video information will have an error associated with the positioning process. In particular, the linear positioning of the vertical pulse along the newly recorded magnetic track will be in relatively close agreement with the linear position of vertical pulses associated with previously recorded video material, differing by a finite amount which is the error associated with the inability of the electronic circuitry to effect exact alignment. In practice the amount of this error can be quite small; however, it is present in a finite amount.

The associated error, notwithstanding the fact that it may be quite small, is significant due to the method employed in the alignment of vertical pulses. In particular, each time an edit function is performed, i.e., additional video information is to be recorded on magnetic tape, the position of the vertical pulse on the immediately preceeding previously recorded video signal is used as the reference position against which the vertical pulse of the new video information will be aligned. Consequently, the amount of error associated with the ability of the electronic circuitry to properly position corresponding vertical pulses, albeit small, is nevertheless finite and additive. Consequently when a series of edits are performed on a magnetic tape, the amount of error present in the placement of the vertical pulse is additive and cumulative. While the amount of error may in itself be quite small, it can still produce undesirable effects due to the additional nature of the process when numerous sequential edits are performed.

SUMMARY OF THE INVENTION

In the new audio tracking method incorporating the present invention, automatic alignment of a rotating magnetic head with information previously recorded on magnetic tape is achieved in the following manner.

In applications employing a positionable magnetic head, the position of the magnetic head is first normalized. In particular, the magnetic head is subjected to damped oscillatory motion which results in the magnetic head being positioned in a normal or centered position.

Thereafter, the phase angle between control track pulses and scanner tach pulse is varied while the amplitude of the demodulated video from the magnetic reproduce head is monitored. The phase angle is adjusted in a first direction until a decrease in the amplitude of the demodulated video is detected. The particular phase angle associated therewith is noted. Thereafter, the phase angle is changed in the reverse direction until there is again detected a decrease in the amplitude of the demodulated video. The point at which this decrease in amplitude occurs is also noted. The two points so determined at which a decrease in the amplitude of the demodulated video occurred are mathematically averaged to derive a point representative of the theoretical center position. This process is repeated several times. The resulting theoretical mid points associated with each of the several processes are then mathematically averaged. The results of the averaging process represents the desired phase angle between control track and scanner pulse for positioning the magnetic head with reference to previously recorded video information on the magnetic tape.

Thereafter the amount of error present in the linear positioning of the vertical pulse along the magnetic track is determined from previously recorded video information. The amount of error detected is then stored for future reference. Thereafter, each time an edit function is desired to be performed, the vertical pulse associated with each field of video information is positioned linearly along the respective magnetic tracks in accordance with the amount of error previously measured and stored. In this way, the amount of error present in the positioning of the vertical pulse for each subsequent edit function is not additive. To the contrary, the amount of error present in the positioning of the vertical pulse on each magnetic track subsequently recorded is the same as initially determined, and is identical for each edit performed. This results in a significant reduction in the amount of error resulting from several edits on the position of the vertical pulse.

DESCRIPTION OF THE FIGURES

FIG. 1 illustrates a portion of the tape transport of a typical video recorder including the scanner, fixed magnetic head, and pinch roller and capstan.

FIG. 2 illustrates a portion of magnetic tape showing the general orientation of recorded magnetic tracks.

FIG. 3 illustrates a positionable magnetic head assembly.

FIG. 4 illustrates in block diagram form a circuit for the production of a damped oscillatory waveform.

FIG. 5a–e illustrate the principle involved in a tracking adjustment wherein the phase angle between control track and scanner tach is varied and the resulting demodulated video signal.

FIG. 6 illustrates in block diagram form apparatus to effect the automatic adjustment of tracking in accordance with the present invention.

FIGS. 7A and 7B illustrate in a flow chart format the operation of the apparatus illustrated in FIG. 6.

FIG. 8a and b illustrate in a basic manner the vertical pulse associated with a video signal and its corresponding general location on a track recorded on magnetic tape.

FIG. 9 illustrates a segment of magnetic tape with the vertrical pulse located in various positions.

FIG. 10 illustrates in a block diagram form apparatus to effect correct placement of the vertical pulse on newly recorded material in accordance with the present invention.

FIG. 11 illustrates in a block diagram form apparatus to measure the position of the previously recorded vertical pulse with respect to the new material to be recorded in accordance with the present invention.

FIGS. 12A and 12B illustrate in a flow chart format the operation of the apparatus illustrated in FIG. 11.

DETAILED DESCRIPTION

The features of the invention are particularly advantageous for track segmental recording of data on magnetic tape by means of one or more magnetic heads rotated at a high speed relative to the tape. While there have been many different recording formats that have been developed, the format in which video or other similarly wide band signals are recorded on magnetic tape as it is transported in a helix around a cylindrically shaped scanning drum has exhibited many distinct advantages in terms of relative simplicity of the tape transport drive and control mechanism, the necessary electronics involved, the number of transducing heads, and the efficient use of tape, in terms of the quantity of tape that is required for recording a given amount of material. By helically wrapping the tape around a rotating scanning head, a single transducing head for reproducing or playing the information that is recorded on the tape can be utilized. When a single head is used in a helical tape recording apparatus, two recognized alternatives are available for wrapping the scanning head, and are generally referred to as the "alpha" wrap and the "omega" wrap apparatus.

The alpha wrap has the tape introduced from one side and wrapped completely around the drum so that it exists on the opposite side and is referred to as the alpha wrap for the reason that it generally conforms to the Greek symbol alpha ($\alpha$) when one views the arrangement from above. The omega wrap introduces the tape by bringing it toward the drum in a generally radial direction and passes it around a guide to bring it in contact with the surface of the drum, helically wraps the tape around the drum, passes it around another guide so that it also exits the drum also in a generally radial direction. This tape generally conforms to the shape of the Greek symbol omega ($\Omega$) when it is viewed from above. Both of these configurations are helical wrapped in that the tape is wrapped around the scanning drum in a helical manner with the tape exiting the drum surface at a different axially displaced position relative to the entry thereof. In other words, if the drum is vertically oriented, the tape leaves the drum surface either higher or lower than when it first contacts the surface. The video information signals are recorded on discrete parallel tracks that are positioned at an angle relative to the longitudinal direction of the tape so that a track length greatly in excess of the width of the tape can be achieved. The angular orientation of the recorded tracks are a function of both the speed of the tape being transported around the scanning drum as well as the speed of rotation of the scanning drum itself. The resultant angle therefore varies depending upon the relative speeds of both the rotating scanning drum and tape being transported.

While the present invention will be specially described in connection with an omega wrap helical video tape recording apparatus, it is equally applicable to an alpha wrap helical tape recording apparatus. Additionally, while the present invention will be described in conjunction with a 360° omega wrap apparatus (it being understood that the tape does not contact the scanning drum a full 360° because of tape entrance and exit dimensional requirements), the present invention is also applicable to helical video tape recorders which utilize less than 360° wrap, e.g., a 180° wrap tape path apparatus having more than one head. It should also be understood that the present invention is applicable to arrangements where the scanning drum can move in either rotational direction and the tape can be introduced either above or below the exit path and moved around the scanning drum in either direction. The relationships of head rotation, tape transport direction and manner of tape guiding, i.e., introducing the tape above or below the path of its exit, can represent up to eight different configurational relationships of which only one will be specifically described herein.

Referring to FIG. 1, tape 10 from a supply reel passes past entry guide 18, around rotating drum 20, past exit guide 22, past stationary magnetic head 16 and between capstan 12 and pinch roller 14 to a take-up reel. A moveable magnetic head 24 as more fully described hereinafter is mounted on a rotating disc inside of rotating drum 20, and coupled by a shaft 26 to a slotted disc 28. Upon correct alignment of slot 32 with the light from source 30, a signal indicative of the relative position of head 24 will be produced from sensor 34.

With the physical arrangement above described, the resulting magnetic tracks 40 will be placed diagonally across the width of tape 10, as illustrated in FIG. 2. Stationary magnetic head 16 will record one or a plurality of magnetic tracks 42 in a generally longitudinal direction. On one of these audio tracks is frequently recorded a signal referred to in the art as control track. The control track signal is a series of regularly spaced pulses which are ultimately used to control several servo systems within the video tape recorder. However, it should be noted that control track pulses are regularly occurring pulses related to longitudinal tape motion. In the present discussion they will be used with reference to the recorded video tracks 40 in the adjustment of tracking.

A magnetic video head signal transducer 24 (FIG. 1) can be mounted on a separate support comprising a scanning drum carrier for rotation coaxially between two stationary guide drums, most commonly cylindrical. Alternatively, the video head 24 can be carried on a support here shown as a rotatable upper guide drum 21 associated with a stationary lower guide drum 23, the coaxialy disposed drums forming a scanning assembly providing a surface 25 for guiding the tape 10. The upper drum 21 is fixed to a drive shaft 26, which is fitted for rotation in a bearing (not shown) mounted on the lower drum 23 and driven by a motor (not shown) in a known manner. The magnetic tape 10 is helically wrapped (i.e., substantially 360°) around the drums 21, 23 for scanning by the head 24. The tape 10 is guided, tensioned and moved (arrows 27) by capstan 12 and pinch roller 14 so that the head 24 carried by drum 21, rotating in direction 29 is opposite the direction of tape transport about the guide drums, scans a series of oblique transverse paths 40 shown in FIG. 2. It should be appreciated that the head 24 can rotate in the same direction as that of the movement of the tape 10 about the guide drums 21, 23. However, this change in head rotation does not alter the implementation of the present invention.

Head 24 is extremely small and of low mass (on the order of 100 milligrams), and consists of two pole pieces 24b and 24c confronting one another across a non-magnetic transducing gap 24a for recording and/or reproducing signals with respect to the tape 10 (see FIG. 3). The gap 24a is aligned with the length thereof substantially parallel to the direction 29 of drum 21 movement relative to the tape 10. It will be understood that in the magnetic recording art the "length" of the gap is the dimension from pole face to pole face, in the direction of relative recording motion. Usually, the "width" of gap is aligned transversely to the relative motion direction and parallel to the recording surface, and the "depth" of the gap is normal to the recording surface. If for any reason the gap is inclined to the direction of relative motion, the length is still defined (at least for purposes of this invention) to be in the direction of relative motion, while the width and depth dimensions are still taken as being orthogonal to the length. Signals are carried to or from the head 24 by means of pole piece windings 41 and lead 39 (see FIG. 3). Signals are coupled between the magnetic head 23 and the recording surface passing the gap 24a through a coupling path that extends between the two pole pieces 24b and 24c through the recording surface in the direction of relative motion, hence the desired track on the surface.

To provide for tracking movement of the head 24 transverse to the direction 29 of the drum 21 movement, the head is mounted or bonded, as by epoxy to one flat side of a positionable element 50, here shown by way of example as a piezoelectric ceramic bender element. It will be seen from FIG. 3 that the head 24 is fitted to the upper rotating drum 21. The piezoelectric bender element 50 is elongated and is mounted at one end in a cantilever support element (not shown) fixed to upper drum 21. The bender element bends in response to an applied voltage direction transverse to the track recorded 40 to deflect the video head 24 laterally.

The details of the particular construction of the positional element 50 are the subject of and are described in the aforementioned commonly assigned and co-pending application of Richard Allen Hathaway, Ser. No. 668,651, now U.S. Pat. No. 4,151,569, issued Apr. 24, 1979, for Positionable Transducer Mounting Structure Using A Piezoelectric Bender Element. A brief description will be included herein to facilitate understanding the present invention. The piezoelectric ceramic bender element 50 is constructed of two layers 12a and 12b of piezoelectric ceramic material sandwiched between electrode members and bonded together in a known manner to an intervening brass vane 51. The element is elongated and significantly wider than thick. For cantilevered positionable elements, a length-to-width aspect ratio of 2:1 and a thickness on the order of 3.0% of the width provides the desired deflection characteristics. The axes of polarization of the two piezoelectric layers are oriented with respect to one another so that, when a voltage is applied across the bonded layers, one layer is caused to expand and the other to contract in a known manner. The drive is thereby caused to flex or bend. The amount of movement depends on the vottage applied across the layers of piezoelectric material. The piezoelectric element 50 is fixed to the cantilever support (not shown) by two electrically insulating spacers 16 located on both flat sides of the element 50 proximate one of its ends. An open-ended protective housing (not shown) surrounds the bender element 50, with the leaf disposed therein to extend from the spacers 16 with its free end outside the open end of the unshown housing whereby the head 24 is supported so that it slightly projects beyond the outside surface 25 of the tape guide drums 20 in transducing relationship with respect to the tape 10. Leads 52, 53, 54 are soldered to the electrodes of the piezoelectric element 50 for coupling a driving voltage to the element. A servo drive circuit (not shown) is connected to control the drive applied to the element 50 in a manner so that the head 40 is maintained in a desired transducing relationship with respect to the tape 10. Consequently the position of the magnetic head 24 can be changed according to the potentials applied to electrodes 52, 53 and 54. This is frequently desirable for special effects, as more fully described in U.S. Pat. No. 4,152,734, entitled Automatic Tracking For A Playback Transducer, issued May 1, 1979.

Broadly speaking, three steps are involved in the automatic positioning of a magnetic head for the recording of information on magnetic tape with reference to previously recorded information: first, normalizing or centering the moveable magnetic head to a normal or center position if the head which is going to be used for recording is of the moveable type; two, adjusting the tracking by a mathematical averaging process in such a manner to correctly physically position the magnetic head with respect to previously recorded magnetic tracks; and three, correctly position the new video information which is to be recorded on the desired magnetic track with reference to time. While the combination of the above three steps will offer the maximum accuracy in the correct positioning of the magnetic head, each step is indeed distinct and can be performed independent of the other two, and will in itself contribute to the accurate positioning of the magnetic head.

While not all video tape recording/reproducing apparatus will employ a moveable head as previously described, such a moveable head is frequently used due to the numerous special effects possible. The use of such a moveable head, however, is usually restricted to the reproduction of previously recorded video information. However, it is possible to use such a moveable head for the recording of video information, in which case it is necessary to normalize or center the position of the head. This is required due to a certain amount of remanent deflection which frequently remains.

The remanent deflection can be removed by subjecting the head to decaying oscillating motion.

Referring to FIG. 4, the output 62 from oscillating signal source 60 is applied to a damping means 64. The purpose of damping means 64 is to reduce the amplitude of the oscillating signal 62 from signal source 60. Attenuation means 66 functions to adjust the amplitude of the resulting damped oscillating waveform to the desired level. Switch $S_1$ responsive to control command 68 closes to connect the damped oscillating waveform to summing means 70. Summing means 70 functions to add the output from switch $S_1$ to the head position control signal 72. The output 74 from summing means 70 is supplied to amplifier 76 which provides the drive signal 78 to the piezoelectric bender element 50 which physically moves head 24.

While it is clear that not all record/reproduce machines employ a positionable magnetic head for the recording of video information, for those machines which do employ such, it is essential that the magnetic head 24 first be positioned in a centered or normalized position. This can be accomplished by applying a damped oscillating waveform to the piezoelectric element. Referring to FIG. 4, removing head position control signal 72 and closing switch S₁ results in the application of a damped oscillating waveform being applied to the piezoelectric element 50. This results in the normalizing of the position of magnetic head 24.

The procedure of removing remanent deflection in a piezoceramic head support is further described in U.S. Pat. No. 4,223,358 entitled Method and Apparatus for Cancelling the Remanent Deflection in a Piezoceramic Head Support Means of a Video Recorder, issued Sept. 16, 1980.

The next step in the precise positioning of a record/reproduce head on previously recorded material relates to the physical positioning of magnetic head 24 over previously recorded magnetic tracks.

The basic considerations present in the positioning of magnetic head 24 precisely over previously recorded magnetic tracks are illustrated in FIG. 5.

FIG. 5(a) illustrates generally the scanner assembly 20, magnetic tape 10, entry and exit guides 18 and 22, stationary magnetic head 16, pinch roller 14 and capstan 12. FIG. 5(b) illustrates the resulting pulse produced by the tachometer arrangement composed of disc 28, slot 32, light source 30, light sensor 34 (FIG. 1) hereinafter referred to as scanner tach. It is clear that scanner tach is directly proportional to angular position of magnetic head 24 (FIG. 1). FIG. 5(c) illustrates a control track pulse reproduced on magnetic head 16. As previously discussed, control track pulses relate directly to linear position of previously recorded video information. FIG. 5(d) illustrates generally a portion of magnetic tape 10 having previously recorded video information 80 thereon. FIG. 5(d) likewise illustrates in dotted lines a typical path traversed by magnetic head 24 when it is positioned grossly off track. As control track pulses are directly related to linear position of previously recorded magnetic information on magnetic tape 10, and scanner tach pulse is directly proportional to angular position of magnetic head 24, it is clear that the phase difference between these two pulses directly relate to longitudinal displacement between the actual path traversed by magnetic head 24, as illustrated by 82 in FIG. 5(d), and the location of previously recorded video information as illustrated by 80 in FIG. 5(d). Consequently the path traversed by magnetic head 24, illustrated by dotted lines in FIG. 5(d) as generally 82, can be made to correspond directly with the track of previously recorded video information illustrated as 80 in FIG. 5(d), by the appropriate adjustment of the phase between the control track and scanner tach pulses.

The above referenced phase angle adjustment is accomplished by monitoring the demodulated video signal from magnetic head 24 while the above referenced phase angle is varied. As the demodulated video information will reach a maximum value when magnetic head 24 is precisely positioned over previously recorded video information, it is clear that the above referenced phase angle is adjusted for a maximum signal from the demodulated video signal for head 24 FIG. 5(e).

FIG. 6 illustrates in a block diagram form automatic tracking adjusting apparatus in accordance with the present invention. Video information 90 from magnetic head 24 is supplied through amplitude detector 92 which produces an RF level signal 94 which is thereafter supplied as an analog input to control logic 100. Manual tracking control 96 supplies an analog voltage to analog to digital converter 98 which functions to convert the analog voltage from tracking control 96 to a digital value at output 102. The output from analog to digital converter 98 is thereafter supplied to switch 104 and control logic 100. Switch 104 provides an output 106 depending upon which of the three input positions switch 104 is selecting. In a second position of switch 104 a fixed digital value 108 is supplied. The third position switch 104 receives the output 112 from latch 110. Auto tracking request push button 114 provides an auto tracking request 116 to control logic 100. Control logic 100 generates a switch control output signal 118 to switch 104. Control logic 100 also generates an eight bit digital number 120 which is supplied to counter 122. Preset output 124 from control logic 100 will result in the digital number present on output 120 being stored in counter 122. Up/down output 126 from control logic 100 controls the direction in which counter 122 will count. Count enable signal 128 from control logic 100 enables counter 122 to subsequently count in the direction indicated by signal 126 in response to clock pulses from signal 130 from control logic 100. Output 131 from counter 122 is supplied as an input to latch 110 as well as an input to control logic 100. The output 106 from switch 104 is supplied in a digital format as an input to variable pulse delay 132. In response to the receipt of a reference pulse 134 variable pulse delay 132 will produce an output pulse 136 delayed an amount determined by the digital value supplied as an input 106 thereto. Phase comparator 138 compares the phase between the output pulse 136 from variable pulse delay 132 with control track pulses 140 received from magnetic head 16 and produces an output signal 142 in response thereto representative of capstan phase error. Output signal 142 is used in the control of capstan servo 144. Capstan servo 144, in response to capstan phase error signal 142, will vary the phase of control track pulses 140 by control of capstan motor 146.

Reference pulse 134 is produced by the video to be recorded.

The operation of the above described apparatus can be more clearly understood with reference to FIG. 7(a) and 7(b), Referring first to FIG. 7(a), upon the pressing of switch 114 control logic 100 as illustrated in block 150 will preset counter 122 to the value from manual tracking control 96. The resulting value in counter 122 will then be transferred to latch 110 by data signal 131 in response to latch control signal 133. Thereafter the output 112 from latch 110 will be supplied to the third input of switch 104. Switch 104 in response to signal 118 will operate to connect output 112 from latch 110 to variable pulse delay 132. Thereafter control logic 100 will wait approximately three seconds as illustrated in block 152 in FIG. 7(a).

Thereafter the average RF signal 94 will be sampled by control logic 100 and stored therein for later use as illustrated in block 154 in FIG. 7(a). Thereafter control logic 100 will determine if the manual tracking value is less than a predefined value in block 156. If the manual tracking value is less than a predefined value 108, control logic 100 will set counter 122 to count in the up direction by use of signal 126, as illustrated generally in block 158 in FIG. 7(a). If, however, the manual tracking value is not less than the said predefined value, control logic 100 will set counter 122 to count in the down direction, as generally indicated in block 160 in FIG. 7(a). Thereafter control logic 100 will again sample the RF amplitude as provided by input signal 94 as indicated in block 162 in FIG. 7(a) and thereafter determine if the current value of the RF amplitude is greater than or equal to the last previous sample. If the value is greater than the last sample, control logic 100 will store the current value of the RF amplitude as indicated generally in block 166 in FIG. 7(b). Thereafter control logic 100 will determine what direction counter 122 is set to count. If the direction of counter 122 is set to count in the up direction, control logic 100 will enable counter 122 to count up by one clock pulse and thereafter store the current count as the high count as indicated generally in block 172 in FIG. 7(b). If, however, the current count direction of counter 122 is set to count in the down direction, control logic 100 will enable counter 122 to count down one clock pulse as indicated generally by block 174 in FIG. 7(b). Thereafter control logic 100 will store the current value contained in counter 122 as a low count. Thereafter control logic 100 by use of latch control signal 133 will transfer the count present in counter 122 to latch 110 indicated generally in block 178 in FIG. 7(b). Thereafter control logic 100 will again wait for the servo system to settle in response to the change made in the value present in latch 110. At this point control logic 100 will again return to block 162 to sample the value of the RF level signal present on signal 94 and repeat the process so described.

If in response to the sampling of the RF amplitude in block 162 current RF amplitudes are not greater than or equal to the last sample, control logic 100 will reverse the direction of counter 122 as indicated generally in block 182 in FIG. 7(a). Thereafter control logic 100 will average the current high count and the current low count together to yield a current center position as indicated generally in block 184 in FIG. 7(a). At this point the above described apparatus has effectively varied the previously discussed phase angle in such a manner to determine the corresponding value on each side of the peak value of the RF level from magnetic head 24. Thereafter control logic 100 will average the new center position with the existing center position and store the resulting numeric average, as illustrated generally by block 186. Thereafter control logic in block 188 will determine if the count direction has charged four times. If the count direction has not changed four times, control logic 100 will again execute the steps generally indicated beginning at block 166 and thereafter. If however, it is determined that the count direction has changed four times, therafter control logic 100 will preset counter 122 to the average of the center values above determined, and thereafter transfer said digital value via data signal 132 to latch 110 for positioning of magnetic head 24 over track 80 (FIG. 5). Thereafter control logic 100 will do nothing further until the receipt of a subsequent signal 116 resulting from push button 114 indicating that the above described procedure should be executed again.

Consequently it is clear that the above described apparatus will correctly position magnetic head 24 over previously recorded magnetic track 80 (FIG. 5) by a process wherein the phase angle is varied in such a manner to determine the points on each side of the RF amplitude curve and thereafter average such points. This process is repeated a plurality of times and the resulting center values obtained thereafter averaged. The final averaged center value is used until the process is initiated again.

The next step involves the correct placement of the video information on the magnetic track. FIG. 8(a) indicates in a general manner the orientation of vertical pulse to video field information. FIG. 8(b) illustrates the corresponding physical location of the vertical pulse on magnetic tape 10. As previously discussed, the vertical pulse occurs at the end of each video field. Consequently referring to FIG. 8(b) it is clear that the vertical pulse is physically located at the end of each magnetic track which is recorded on video tape 10. From FIG. 8(b) it is clear that there is a general location on video tape 10 parallel to one edge thereof wherein vertical pulses are located generally.

Referring to FIG. 9, a section of video tape 10 is illustrated. The correct position for the location of the vertical pulse on the track is indicated thereon generally. In addition, the actual position of vertical pulse on a track which was incorrectly recorded is illustrated. This can occur for numerous reasons well known to those skilled in the art. Consequently there exists an error in the position of the vertical pulse across the width of magnetic tape 10. FIG. 9 also illustrates an edit point. Subsequent to this edit point, it is desirable to insert additional new video information in such a manner to precisely match previously recorded video information. By inspection of FIG. 9, it is clear that the actual location of the vertical pulse information previously recorded on magnetic tape 10 is incorrect. However, the new information which is desired to be recorded on the magnetic tape must be recorded in such a position that the location of the vertical pulse will match the incorrect position of the previously recorded video information. This can be done by recording the new information in such a manner that the location of the vertical pulse of the resulting magnetic tracks of the newly recorded video material will match the location of the vertical pulse on the magnetic tracks of previously recorded video information, albeit it is incorrectly located.

In the following procedure the amount of error between the correct position for the location of vertical pulse information and the actual location of vertical pulse information is measured once, and the amount of error so detected is thereafter stored. Thereafter each time another edit operation is desired to be performed, the amount of error so determined initially is used to determine the placement of the vertical pulse on the magnetic track to be recorded, i.e., the new material is recorded with the vertical pulse located according to the error previously detected. It should be clearly understood that the amount of error is determined once, and the value subsequently stored, preferably in a digital format. Thereafter, this value is used for all subsequent edit operations. This is in distinction to the method used in the prior art wherein the amount of error in the placement of the vertical pulse is determined anew for each edit based on the amount of measured error in the immediately preceeding video information.

In FIG. 10 video information from magnetic head 24 located on scanner 20 is supplied to video demodulator 200. The output 202 from demodulator 200 is applied to sync separator 204. Sync separator 204 functions to remove vertical pulse information from demodulated video signal 202. Consequently the output 206 from sync separator 204 is vertical pulse information from video on tape. Phase comparator 208 operates to compare the phase between the vertical information present on signal 206 with the vertical pulse supplied from a reference vertical input 210, and is further described below and in FIG. 11. At this point it is observed that the reference vertical would be a reference signal supplied from an external source, generally termed "house sync" as is well known to those skilled in the art. The amount of error detected by phase converter 208 is subsequently stored in offset error storage means 214. Consequently, the number stored in offset error storage 214 illustrated in FIG. 10 represents the error in position of vertical pulse generally indicated in FIG. 9.

Referring once again to FIG. 10, scanner motor 216 operates to rotate the scanner and the associated tachometer disc 28 attached thereto. Tachometer pulse, herein referred to as tachometer pulse 218, is supplied to error detecting means 220. Error detection means 220 serves to compare the actual position of the magnetic head 24 located on scanner 20 with the desired position as indicated by signal 222 and generates the desired error correction signal 224 to motor drive 226. Motor drive 226 thereafter supplies the necessary drive signal to scanner motor 216.

The operation of phase comparator 208 is further described in FIGS. 11 and 12.

Referring to FIG. 11, the output 206 from sync separator 204 and reference vertical pulse 210 are each applied to the input to exclusive OR-gate 230. The output 232 from exclusive OR-gate 230 is consequently true when the respective inputs thereto are not in the same logical state. Consequently the output 232 from exclusive OR-gate 230 is a pulse the occurrence of which represents an error between reference vertical pulse 210 and the vertical pulse from syn separator 204. The output 232 from exclusive OR-gate 230 is supplied to the enable input to counter 234. The clock input of counter 234 is connected to a 2 megahertz clock source. Consequently counter 234 will operate to count at a 2 megahertz rate when the output from exclusive OR-gate 230 is true. In this way the count determined by counter 234 is a digital number representative of the amount of error, measured in time, between the reference vertical pulse and the pulse 206 from sync separator 204, which Is the vertical pulse of the video signal recorded on the tape.

The output 236 from counter 234 is supplied to control logic 100. Control logic 100 also generates reset signal 238 to counter 234. Control logic 100 also generates signal 212 which represents the offset error which is thereafter supplied to variable phase offset 228 (FIG. 10).

The operation of phase comparator 208 as illustrated in FIG. 11 can better be understood with reference to FIG. 12. Referring first to FIG. 12(a) control logic 100 first reads the value of the number present in counter 234 as indicated by block 240. Thereafter control logic 100 will average the value so read from counter 234 with the previous measurement. Initially, the number used for the previous measurement will be a predefined constant.

Thereafter control logic 100, as indicated by step 244 will store the results of the numeric average performed in step 242. Thereafter control logic 100 will reset counter 234 by use of the appropriate signal 238 to the reset input of counter 234. Thereafter control logic 100 will again repeat the above described sequence at the mid point of the next television field. In this regard it should be noted that control logic 100 performs the above described operations during each television field, and begins the performance of said operation by performing step 240 at the approximate mid point of each television field.

Referring next to FIG. 12(b) step 250 indicates control logic 100 has determined the average vertical pulse phase error which was previously determined in step 242 illustrated in FIG. 12(a). Thereafter control logic 100 checks the amount of error so determined in step 242 with a predefined numeric constant. This predefined numeric constant represents the maximum value beyond which it is not possible to correct an error in the location of the vertical pulse on magnetic tape 10. If the amount of error so determined is greater than that which can be corrected control logic 100 will thereafter warn the operator of this condition, as illustrated in step 264 and thereafter do nothing further. If however the amount of error so detected is within the ability of the apparatus to correct thereof, control logic 100 will subtract the amount of error so determined by the averaging performed in block 242 from a numeric value which would correspond to a nominal position. This value so determined would then be sent to the scanner servo. Thereafter control logic 100 would wait for the scanner servo to adjust according to the value previously sent to it as a result of the operation described above in step 254. Therafter control logic 100 will again determine the amount of phase error present by reading the count present in counter 234. Thereafter control logic 100 will determine if the phase error so determined is greater than 2 microseconds in block 260. If the amount of phase error is less than 2 microseconds nothing further is required to be done by control logic 100; however if the amount of phase error is greater than 2 microseconds control logic 100 will add the error previously determined in step 258 to the numeric value corresponding to nominal position and send the result to the scanner servo, as indicated in block 262. Thereafter control logic 100 will do nothing further.

In accordance with the present invention, the apparatus generally illustrated in FIG. 10 will operate as above described to determine the amount of error in the position of vertical pulse as illustrated in FIG. 9. The amount of the detected error is subsequently stored. Thereafter when it is desired to perform an edit operation, video information will be positioned on magnetic tape 10 with the location of the corresponding vertical pulse appropriately located on magnetic tape 10 in the desired position to correspond with the amount of error determined and stored in offset error storage 214.

What is claimed is:

1. Apparatus responsive to a first reference vertical pulse representative of a reference location for a vertical pulse on a magnetic tape and a second pulse representative of the actual location of a vertical pulse on a prerecorded magnetic tape for positioning a plurality of subsequent recordings of video information on magnetic tape, the subsequent recordings having respective vertical pulses, comprising:

measuring means for determining a first phase error between the first and second pulses;

first storage means responsive to said measuring means for storing the phase error; and, means responsive to said first storage means for adjusting the respective linear positions of video information on each subsequent recording on said magnetic tape such that the phase error associated with each of the positions of the respective vertical pulses of said subsequent recordings is identical to said first phase error.

2. Apparatus as recited in claim 1, wherein said means for adjusting further comprises:

drive means for driving a video scanner motor;

scanner tach means operatively associated with said scanner motor for producing a scanner tach pulse indicative of the actual position of a video scanner head;

variable phase offset means for adjusting said first pulse by an amount corresponding to said first phase error stored in said first storage means to produce a desired position signal for the position of each of said subsequent recordings; and, error detection means responsive to said desired position signal and said scanner tach pulse for generating a desired error correction signal for said drive means.

3. A method responsive to a first reference vertical pulse representative of a reference location for a vertical pulse on a magnetic tape and a second pulse representative of the actual location of a vertical pulse on a prerecorded magnetic tape for positioning a plurality of subsequent recordings of video information on the magnetic tape, the subsequent recordings having respective vertical pulses, comprising the steps of:

determining a first phase error between the first and second pulses;

storing the first phase error; and, adjusting the respective linear positions of video information of each subsequent recording on said magnetic tape such that the phase error associated with each of the positions of the respective vertical pulses of said subsequent recordings is identical to said first phase error.

4. A method as recited in claim 3, wherein the step of adjusting the respective linear positions further comprises the steps of:

producing a pulse indicative of the actual position of a video scanner head;

adjusting said first pulse by an amount corresponding to said stored first phase error to produce a desired position signal for the position of each of said subsequent recordings;

generating a desired error correction signal responsive to the production of said desired position signal and said pulse; and, adjusting the respective linear position of each said subsequent recordings responsive to the generation of said desired error correction signal.

5. Apparatus for adjustment of magnetic head tracking position responsive to control track pulses and for positioning a plurality of subsequent recordings of video information on a magnetic tape in response to a first reference vertical pulse representative of a reference location for a vertical pulse on a magnetic tape and a second pulse representative of the actual location of a vertical pulse on a pre-recorded magnetic tape, the subsequent recordings having respective vertical pulses, comprising:

first means for determining the level of the video signal;

second means responsive to said first means for changing the phase between the control track and first pulses a plurality of times and producing a first output indicative of a desired value of said phase;

third means responsive to said first output for adjusting the phase between the control track and first pulses to said desired value;

fourth means for determining a first phase error between the first and second pulses;

fifth means responsive to said fourth means for storing the first phase error; and, sixth means responsive to said fifth means for adjusting the respective linear positions of video information on each subsequent recording on said magnetic tape such that the phase error associated with each of the positions of the respective vertical pulses of said subsequent recordings is identical to said first phase error.

6. Apparatus as recited in claim 5, wherein said second means further comprises:

seventh means responsive to said first means for changing the phase between the control track and first pulses in a first direction;

eigth means responsive to said first means for changing the phase between the control track and first pulses in a second direction; and, ninth means responsive to said first, seventh and eighth means for producing said first output.

7. Apparatus as recited in claim 6, wherein:

said seventh means changes said phase in said first direction until said first means determines, at a first point, that said video signal level has begun to decrease;

subsequent to said change of said phase in said first direction, said eighth means changes said phase in said second direction until said first means determines, at a second point, that said video signal has again begun to decrease, and further comprising means for storing first and second values corresponding to said first and second points, respectively; and, means for obtaining a mathematical average of said first and second values to yield a value corresponding to a theoretical center position of said phase.

8. Apparatus as recited in claim 7, wherein:

said phase is changed in said first and second directions a predetermined number of iterations;

said averaging means obtains a plurality of center values responsive to said predetermined number of iterations; and, said averaging means further obtains successive mathematical averages of said center values.

9. Apparatus for adjustment of the magnetic head tracking position of a positionable magnetic record/reproduce head relative to a magnetic track, and being responsive to a first reference vertical pulse representative of a reference location for a vertical pulse on a magnetic tape and a second pulse representative of the actual location of a vertical pulse on a pre-recorded magnetic tape for positioning a plurality of subsequent recordings of video information on magnetic tape, the subsequent recordings having respective vertical pulses, comprising:

first means for producing a monotonically decreasing oscillatory waveform;

second means for producing a control signal;

third means responsive to said control signal for coupling said first means to said magnetic head, whereby the position of said magnetic head is normalized relative to said magnetic track;

fourth means for determining a first phase error between the first and second pulses;

fifth means responsive to said fourth means for storing the first phase error; and, sixth means responsive to said fifth means for adjusting the respective linear positions of video information on each subsequent recording on said magnetic tape such that the phase error associated with each of the positions of the respective vertical pulses of said subsequent recordings in identical to said first phase error.

10. Apparatus for adjustment of the magnetic head tracking position of a positionable magnetic record/reproduce head relative to a magnetic track responsive to control track pulses in a video recorder/reproducer apparatus, and for positioning a plurality of subsequent recordings of video information on a magnetic tape in response to a first reference vertical pulse representative of a reference location for a vertical pulse on a magnetic tape and a second pulse representative of the actual location of a vertical pulse on a prerecorded magnetic tape, the subsequent recordings having respective vertical pulses, comprising:

first means for producing a monotonically decreasing oscillatory waveform;

second means for producing a control signal;

third means responsive to said control signal for coupling said first means to said magnetic head, whereby the position of said magnetic head is normalized relative to said magnetic track;

fourth means for determining ths level of the video signal;

fifth means responsive to said fourth means for changing the phase between the control track and first pulses a plurality of times and producing a first output indicative of a desired value of said phase;

sixth means responsive to said first output for adjusting the phase between the control track and first pulses to said desired value;

seventh means for determining a first phase error between the first and second pulses;

eigth means responsive to said seventh means for storing the first phase error; and, ninth means responsive to said eighth means for adjusting the respective linear positions of video information on each subsequent recording on said magnetic tape such that the phase error associated with each of the positions of the respective vertical pulses of said subsequent recordings is identical to said first phase error.

11. Apparatus as recited in claim 10, wherein said fifth means further comprises:

tenth means responsive to said first means for changing the phase between the control track and first pulses in a first direction;

eleventh means responsive to said first means for changing the phase between the control track and first pulses in a second direction; and means responsive to said fourth, tenth and eleventh means for producing said first output.

12. Apparatus as recited in claim 11, wherein:

said tenth means changes said phase in said first direction until said fourth means determines, at a first point, that said video signal level has begun to decrease;

subsequent to said change of said phase in said direction, said eleventh means changes said phase in said second first direction until said fourth means determines, at a second point, that said video signal has again begun to decrease, and further comprising means for storing first and second values corresponding to said first and second points, respectively; and, means for obtaining a mathematical average of said first and second values to yield a value corresponding to a theoretical center position of said phase.

13. Apparatus as recited in claim 12, wherein:

said phase is changed in said first and second directions a predetermined number of iterations;

said averaging means obtains a plurality of center values responsive to said predetermined number of iterations; and said averaging means further obtains successive mathematical averages of said center values.

* * * * *

UNITED STATES PATENT AND TRADEMARK OFFICE
CERTIFICATE OF CORRECTION

PATENT NO. : 4,689,706

DATED : August 25, 1987

INVENTOR(S) : David C. O'Gwynn

It is certified that error appears in the above-identified patent and that said Letters Patent is hereby corrected as shown below:

```
Column 15, line 38, delete "syn" insert --sync--;
           line 48, delete "ls" insert --is--;
Column 17, line 66, delete "ccmprising" insert --comprising--;
Column 20, line 25, after "said" insert --first--;(3rd occurr.)
Abstract,  line 11, after "measurement" add --and this
                    single offset error is stored and used
                    in all subsequent edit operations.
```

Signed and Sealed this

Twenty-second Day of March, 1988

Attest:

DONALD J. QUIGG

Attesting Officer

Commissioner of Patents and Trademarks